June 9, 1931.    K. WATSON    1,808,911
VALVE ALARM
Filed Sept. 8, 1930
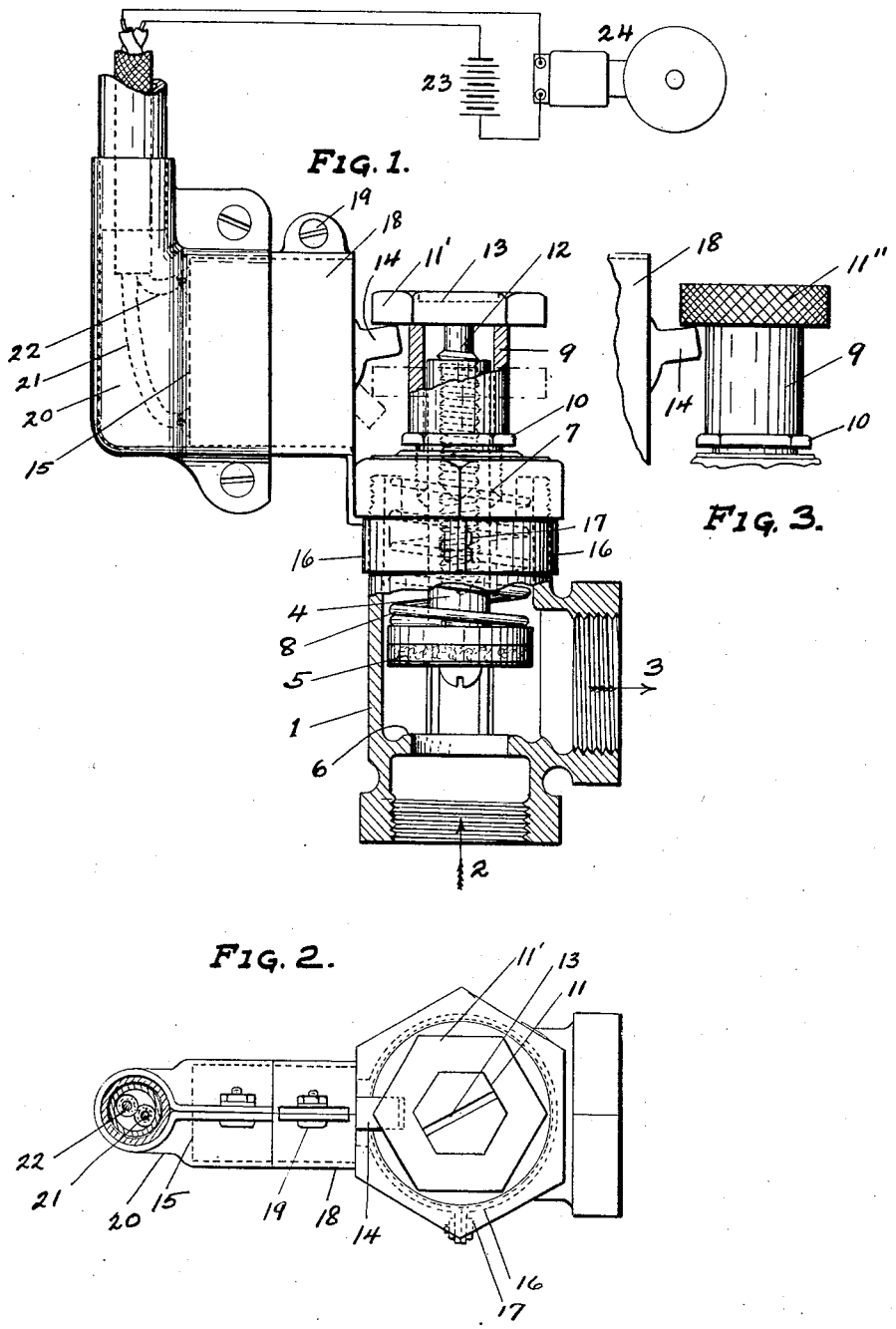
INVENTOR.
KENNETH WATSON
BY Miller Boyken Brief
ATTORNEYS.

Patented June 9, 1931

1,808,911

UNITED STATES PATENT OFFICE

KENNETH WATSON, OF SAN FRANCISCO, CALIFORNIA

VALVE ALARM

Application filed September 8, 1930. Serial No. 480,385.

This invention relates to automatic emergency valves as used for automatically shutting off pipe lines in case of fire or emergency, and has for its object the actuation of an alarm by and upon the shutting of the valve so that an attendant elsewhere in the building or at a remote point will be either audibly or visibly apprised of the closing of the valve.

Other objects of the invention are to provide a simple structure of this character which may at all times be relied upon to operate, though not called upon to do so for years at a time, also such a construction which will cooperate with the common type of electric toggle snap switch, also a special construction whereby the invention may be quickly applied both to an existing type of emergency valves and to a common toggle snap switch and will form a unitary cooperating structure of the three parts. Other features of the invention will appear in the following description and accompanying drawings.

In the drawings Fig. 1 is a side elevation of my complete invention showing the valve broken away to reveal its inner construction.

Fig. 2 is a plan view of the assemblage of Fig. 1.

Fig. 3 is an elevation of a portion of the assemblage showing a modified form of the switch operating flange of the valve plunger.

In further detail the valve is of the type to be placed on a gas service pipe, oil fuel pipe, ammonia pipe, or other pipe carrying dangerous fluids which it is highly important be quickly shut off in case of fire nearby. Such valves are of known construction and in the drawings it takes the form of an angle valve body 1 with inlet at 2 and outlet at 3, while within is a vertically movable plunger or stem 4 carrying a valve 5 at its lower end adapted to fit upon a seat 6 for closing the inlet 2 when the plunger is down.

The plunger passes through a stuffing box 7 and is normally forced downward by a spiral spring 8, though held up with the valve open by means of a fusible link or cylindrical member 9 of easily fusible metal interposed between the gland nut 10 of the stuffing box and a flange-like nut 11 on the upper end of a screw 12 which screws into a threaded bore in the plunger for drawing the same up when nut 11 is turned, and when so adjusted the valve is "set" open ready for tripping to shut off the inlet 2 the moment any dangerous increase of temperature, as from a nearby fire, should heat the fusible link 9 to its melting point.

As shown in Fig. 2 the nut 11 on these valves as furnished is a hexagon one just about large enough to overlie the upper end of the fusible member 9, and it also is provided with a screw driver slot 13 to turn it when pulling up the plunger 4 and compressing spring 8.

My invention requires that this nut be enlarged so as to extend beyond the fusible link 9 so as to engage the toggle lever 14 of a common type of electric snap switch block 15, and accordingly I solder or otherwise attach an enlarging section 11' to the nut 11, and hold the switch block and valve in definite operative relation by means of a double yoke device provided with a split collar 16 clamping about the neck of the valve as by means of a screw 17 and a similar split collar 18 clamping about the outer end of a switch block as by means of a screw 19.

The other end of the switch block is clamped in the complementarily formed opening of a conduit box 20 in which the terminal leads 21, 22 of the alarm circuit extend to the switch mechanism. This switch mechanism is not detailed as any snap switch construction will do and it is not claimed herein.

The alarm circuit receives its current from any suitable source of electric energy such as the battery indicated at 23, and extends to any form of visible or audible alarm as the electric bell 24.

In operation, assuming the device to be "set" as in Fig. 1 with the fusible link 9 in place and the toggle switch lever 14 up against the nut 11' and circuit broken by the switch, then upon an adjacent fire, or deliberately applied heat, melting the link, the nut 11' will instantly be forced downward to the dotted position upon closing of the valve and carry the toggle with it and to close the circuit and set off the alarm which may be, say in the hotel clerk's office to give notice that a fire in the basement has shut off the gas or oil fuel switch, and thus give advance notice of the dangerous condition without waiting for the smoke and flames to appear.

It will be noted that the nut 11' snaps down upon melting of the link or member 9 and that therefore it will throw any switch to make contact but the use of a snap switch gives an added element of safety as it will instantly close the contact if carried just a trifle over center in its downward movement, and in setting the device the toggle 14 is arranged just above center so that a very slight movement of nut 11' in a downward direction will suffice to snap the switch and sound the alarm.

Fig. 3 shows a modification of the toggle actuating nut and wherein it is made in the form of a round flange 11'' knurled on the outer edge for manipulating by hand for adjusting to correct position.

I claim:

1. In combination, a pipe valve provided with means for automatic closing, an electric alarm circuit provided with a switch arranged adjacent said valve, means for normally holding the valve open and means on said valve arranged to trip said switch upon closing movement of said valve.

2. In combination, a pipe valve provided with means for automatic closing and a fusible link holding the same open, an electric alarm circuit provided with a switch arranged adjacent said valve, and means on said valve arranged to trip said switch upon closing movement of said valve.

3. In combination, a pipe valve provided with means for automatic closing and a fusible link holding the same open, an electric alarm circuit provided with a switch arranged adjacent said valve, means holding said valve and switch in operative relation, and means on said valve arranged to trip said switch upon closing movement of said valve.

4. A valve body provided with a spring-actuated valve, and a slidable valve stem projecting out of the body, means for holding the stem out with valve open including a fusible link device and a flange movable with said valve stem supported against said fusible link, an electric switch arranged adjacent said valve provided with an operating lever arranged in the path of the flange for tripping upon movement of the flange.

5. A valve body provided with a spring-actuated valve having a movable portion projecting from the body, means for normally holding the valve open against the spring, an electric switch arranged adjacent said valve body, and means carried by said movable portion arranged and adapted upon movement to trip said switch.

6. A valve body provided with a spring-actuated valve having a movable portion projecting from the body, means for normally holding the valve open against the spring, an electric switch arranged adjacent said valve body, a device firmly clamping said switch and said valve in operative relation, and means carried by said movable portion arranged and adapted upon movement to trip said switch.

7. A valve body provided with a spring-actuated valve having a movable portion projecting from the body, means for normally holding the valve open against the spring an electric switch arranged adjacent said valve body, a yoke provided with means encircling said valve and said switch holding same in operative relation, and means carried by said movable portion arranged and adapted upon movement to trip said switch.

8. A pipe valve body provided with an axially movable valve and protruding valve stem, a screw threaded to the outer end of said stem and provided with a laterally extending flange, means normally holding the valve in one position and a toggle switch arranged adjacent said body with its toggle in the path of said flange to be operated upon movement thereof.

9. A pipe valve body provided with an axially movable valve and protruding valve stem, a screw threaded to the outer end of said stem and provided with a laterally extending flange, means for normally holding the valve in one position, a toggle switch arranged adjacent said body with its toggle in the path of said flange to be operated upon movement thereof, and means holding the valve body and switch in operative relation to one another.

KENNETH WATSON.